United States Patent [19]

Gerber

[11] Patent Number: 5,005,296

[45] Date of Patent: Apr. 9, 1991

[54] PLOTTER AND INK PRESSURIZING PUMP

[75] Inventor: Heinz J. Gerber, West Hartford, Conn.

[73] Assignee: Gerber Garment Technology, Inc., West Tolland, Conn.

[21] Appl. No.: 407,958

[22] Filed: Sep. 15, 1989

[51] Int. Cl.[5] ....................... G01D 15/16; F04B 19/04

[52] U.S. Cl. ......................................... 33/18.1; 33/34; 33/23.03; 346/140 R; 346/140 A; 417/466

[58] Field of Search .................... 33/18.1, 26, 34–39.2, 33/19.2, 19.3, 21.1, 23.03; 346/140 R, 140 A; 417/461, 466, 489, 569, 566; 92/13.7, 60.5

[56] References Cited

U.S. PATENT DOCUMENTS

| | | | |
|---|---|---|---|
| 2,254,084 | 8/1941 | Nilson | 417/466 |
| 2,391,163 | 12/1945 | Jessup | 92/13.7 |
| 2,756,683 | 7/1956 | Newman | 417/569 |
| 3,065,886 | 11/1962 | Smalley, Jr. | 346/140 |
| 3,078,033 | 2/1963 | Ovrotsky | 417/489 |
| 3,150,915 | 9/1964 | Dixon et al. | 346/140 R |
| 3,229,864 | 1/1966 | Roder | 417/566 |
| 3,246,604 | 4/1966 | Brailsford | 92/13.7 |
| 3,341,860 | 9/1967 | Schweitzer | 346/140 R |
| 3,371,350 | 2/1968 | Sanderson et al. | 346/140 R |
| 3,380,387 | 4/1968 | Kofink | 92/605 |
| 3,680,985 | 8/1972 | Ginsberg et al. | 417/489 |
| 4,325,072 | 4/1982 | Rösel | 346/140 R |
| 4,379,681 | 4/1983 | Goudy, Jr. | 417/566 |
| 4,392,147 | 7/1983 | Rösel | 346/140 R |
| 4,679,989 | 7/1987 | Harriman et al. | 417/489 |
| 4,759,263 | 7/1988 | Lehle | 92/60.5 |
| 4,835,872 | 6/1989 | Alcantara Perez et al. | 33/26 |

*Primary Examiner*—Thomas B. Will
*Assistant Examiner*—William C. Dowling
*Attorney, Agent, or Firm*—McCormick, Paulding & Huber

[57] ABSTRACT

A pen plotter includes a means for applying pressurized air to the ink reservoir supplying the pen with ink. A pressure sensor associated with the pressurized air space provides an out-of-ink signal when the reservoir and pen become empty and the air pressure becomes lost due to air leakage through the pen. The plotter may be one in which a web of paper is intermittently advanced to bring fresh portions of the web to a support surface cooperating with the pen, and in which a pump is used to supply the pressurized air. The pump is driven by the same motor as drives the means for advancing the paper so that the pump is operated only during paper advancements. The pump is of a simple low cost construction and is adjustable to vary the pressure maintained in the ink reservoir.

10 Claims, 5 Drawing Sheets

PLOTTER AND INK PRESSURIZING PUMP

BACKGROUND OF THE INVENTION

The present invention relates to an X-Y plotter of the type wherein drawings and/or other graphics are drawn by a pen onto paper supported by a support surface with which the pen is associated, and deals more particularly with a means for supplying pressurized air to a reservoir holding ink used by the pen to achieve an acceptable flow of ink from the pen during a drawing procedure and with a means for indicating when the ink reservoir is out of ink.

Pen plotters, particularly those using ball-point pens or capillary tube pens, have long been recognized as having potential problems in obtaining an adequate flow of ink from the pen to achieve the drawing of continuous lines without the appearance of gaps or weak line portions. This problem has been solved, or greatly reduced, in many instances by pressurizing the ink supply to the pen either by directly pumping the ink itself, by supplying the ink in a pre-pressurized capsule, or by providing a refillable ink reservoir pressurized by an overlying volume of pressurized air. In the latter case the air for pressurizing the reservoir is typically supplied to it by an air pump driven by its own separate motor. The use of a separate motor for the air pump, however, adds cost and complexity to the plotter, and the pump itself is often of greater capacity than required and otherwise not well suited to its application.

Also, if the ink in the ink reservoir becomes all used up, the pen will naturally fail to draw acceptable lines due to lack of ink, and some means should be provided to warn of an out of ink condition and/or to prevent further operation of the plotter when such condition arises.

The general object of this invention, is, therefore, to provide a plotter of the aforedescribed type wherein the ink is supplied to the pen from a refillable reservoir and is pressurized by an overlying volume of pressurized air in an efficient way to promote an acceptable flow of ink from the pen during a line drawing procedure.

In keeping with this general object, a more detailed object of this invention is to provide a plotter wherein the overlying volume of pressurized air is pressurized by an air pump driven by the same motor as used to advance paper web or other sheet material which is drawn on by the pen over the support surface.

A further object of the invention is to provide an improved air pump, of simple inexpensive construction, particularly well adapted for use with a plotter of the type mentioned in the preceding paragraph for pressurizing the air overlying the ink in the ink reservoir, and which pump is capable of keeping such air adequately pressurized even though driven only periodically when the paper is advanced.

Another object of the invention is to provide a plotter with an ink reservoir wherein the ink is pressurized by an overlying volume of pressurized air and including a simple means for providing a signal indicating an "out of ink" condition, which signal may be used to operate an associated indicator or warning device and/or to interrupt further operation of the plotter.

Other objects and advantages of the invention will be apparent from the following description of detailed embodiments of the invention and from the accompanying drawings and claims.

SUMMARY OF THE INVENTION

The invention resides in a plotter having a support surface for supporting sheet material, a pen mechanism with a pen movable over the support surface for drawing on the sheet material supported by the support surface, a refillable reservoir means for containing ink supplied to the pen, and an ink pressurizing means providing a volume of air overlying the ink in the reservoir to pressurize such ink; and it also resides in a simple associated means providing a signal which appears when the reservoir becomes empty of ink.

The invention further resides in the plotter being one in which the sheet material is provided as a web of sheet material and is advanced over the support surface by a web advancing means including a drive motor, and in the pressurizing means being an air pump supplying pressurized air to the space overlying the ink in the reservoir which pump is driven by the drive motor of the web advancing means. In keeping with this, the invention in more detail resides in the drive motor directly driving a web take-up roll and in the pump being driven by an eccentric member driven in turn by a belt trained over a pulley rotatable with the take-up roll and another pulley rotatable with the eccentric member.

The invention still further resides in a pump of simple construction for supplying pressurized air to an ink reservoir, the pump having a cylindrical chamber receiving a piston with the piston extending from the chamber and being connectable with an eccentric member, the piston between its inner and outer ends being adjustable in length to vary the compression ratio of the pump and to thereby vary the pressure of the air supplied to the ink reservoir. Also, the piston chamber has inner and outer portions of different diameter connected to one another by an intermediate portion of generally conical shape. The piston at its inner end has an O-ring or similar element providing a piston ring and the stoke of the piston is such that during a minor portion of its stroke the piston ring enters the intermediate portion of the chamber allowing atmospheric air to enter the inner portion of the chamber where it subsequently becomes compressed during a further portion of the piston stroke, this construction providing a simple air inlet means for the pump avoiding undue wear of the piston ring.

The invention also resides in the space which receives the air for pressurizing the ink having associated with it a pressure switch responsive to the pressure of the air in such space, and the air pressurizing means being such that said air in said space has a pressure above a predetermined value for as long as some ink from said reservoir reaches said pen and such that the pressure of said air in said space falls below said predetermined value, due to flow of air through said pen, when ink from the reservoir no longer reaches said pen due to said reservoir, the line connecting said reservoir to said pen, and said pen itself being empty of ink, said switch producing a signal when the sensed pressure falls below said predetermined value, such signal accordingly indicating the reservoir being out of ink or indicating some other failure interrupting the maintenance of pressurized air on the ink in the reservoir.

DETAILED DESCRIPTION OF THE PREFERRED EMBODIMENTS

Figure 1:
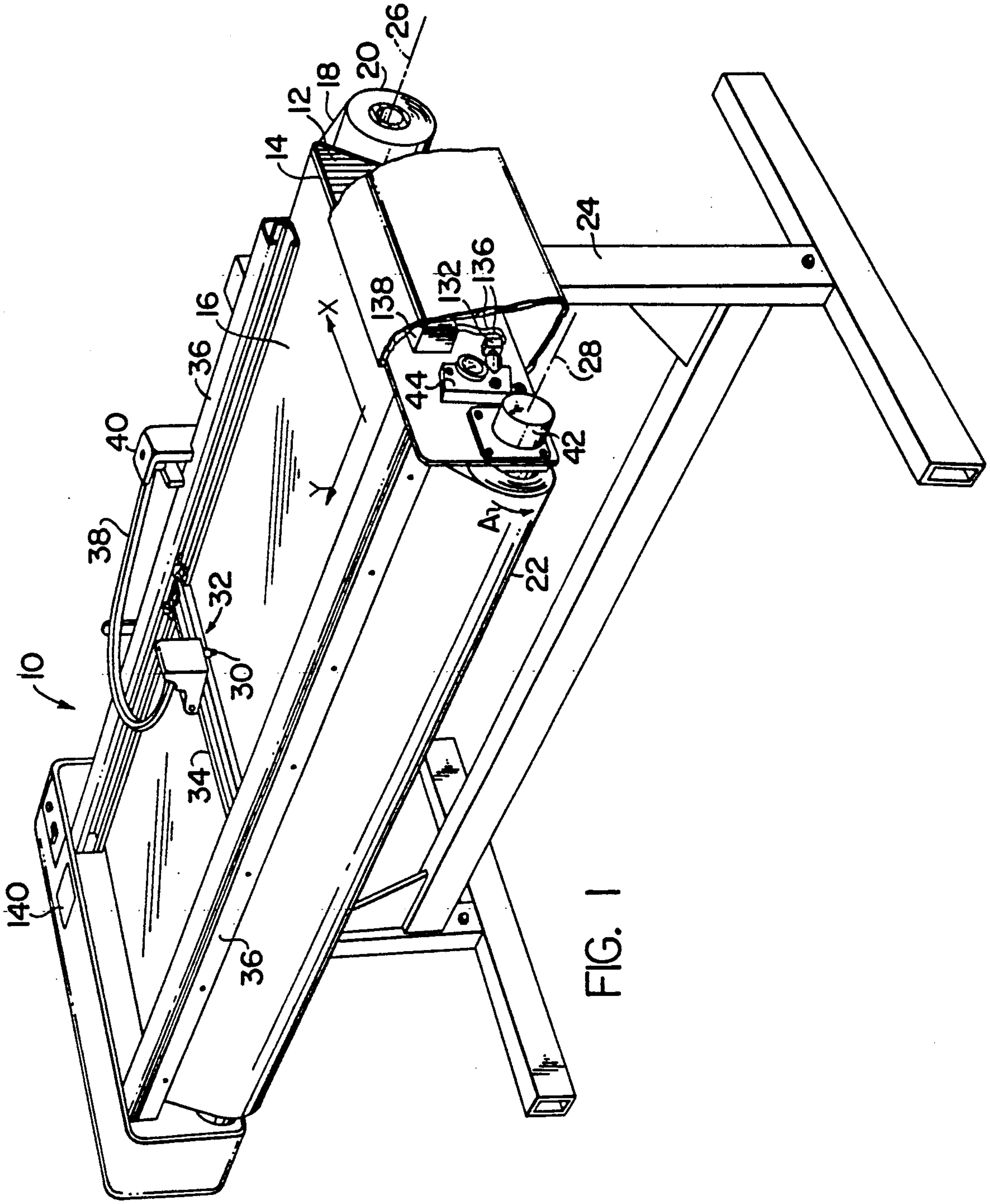
FIG. 1 is a perspective view of a plotter embodying the invention with portions of it being broken away to reveal further details.

FIG. 1 shows a plotter, indicated generally at 10 embodying the present invention. Except for a pump and related parts for supplying pressurized air to a reservoir for the ink used by the plotter's pen, the plotter, by way of example, is taken to be the same as that shown by pending U.S. patent application Ser. No. 07/195,128 filed on May 17, 1988, now U.S. Pat. No. 4,916,819, by the same inventor as that of this application and entitled PROGRESSIVE PLOTTER WITH UNIDIRECTIONAL PAPER MOVEMENT. Reference may be had to said application for further details of the plotter, if desired.

For the present it is sufficient to note that the plotter 10 has a table 12 providing an upwardly facing horizontal support surface 14 for supporting a portion 16 of a web of paper 18. The paper 18 is supplied from a supply roll 20 and is wound onto a take-up roll 22, with both of the rolls 20 and 22 being suitably supported for rotation relative to the frame 24 of the plotter about axes 26 and 28, respectively.

The plotter 10 operates to draw drawings or other graphics on the portion 16 of the paper 18 supported by the support surface 14. The drawing is performed by a pen 30 forming part of a pen mechanism 32 movable in the illustrated X and Y coordinate directions, the mechanism being movable in the X coordinate direction relative to a carriage 34 extending in the X direction and movable in the Y direction along the length of two side rails 36,36 extending in the Y direction at opposite sides of the table 12. Electrical power, electrical signals, and pressurized air for pressurizing the ink used by the pen 30 are communicated between the pen mechanism 32 and the remainder of the plotter by a flexible wand 38 having one end pivotably connected to the pen mechanism 32 and its other end pivotably connected to a fitting 40 fixed to one of the rails 36 as shown.

The paper 18 in going from the supply roll 20 to the take-up roll 22 passes over the support surface 14. Advancement of the paper over the surface 14, to bring fresh portions of the paper to the surface 14, is obtained by operation of a drive motor 42 which rotates the take-up roll 22 in the direction of the arrow A of FIG. 1 to wind paper onto the roll 22. The advancement of the paper over the surface 14 may be coordinated with the drawing operation of the pen mechanism in various different ways, but most commonly the pen mechanism is operated to draw a portion of a graphic on the portion 16 of the sheet material then on the support surface 14, the paper is then advanced to bring a fresh portion to the surface 14, and then the drawing operation is again resumed to draw another portion of the graphic on the fresh portion of the paper, and these alternate drawing phases and advancement phases are continued until a complete graphic is generated.

In accordance with the invention, the plotter 10 of FIG. 1 also includes an air pump 44 for supplying pressurized air to an air space connected in overlying relationship to the ink contained in an ink reservoir included in the pen mechanism 32. This pump 44 is adapted and arranged to be driven by the same motor 42 as drives the take-up roll 22. This means that the pump is driven intermittently in unison with the intermittent advancements of the paper 18.

Reference may now be made to FIGS. 2-7 for an understanding of the drive mechanism for the pump 44 and of its construction.

Considering first the drive for the pump, the motor 42 has its housing fixed to the frame 24 of the plotter and includes an output shaft 46 coaxial with the axis 28 of the take-up roll 22. Rotatably fixed to the shaft 46 is a coupling member 48 (FIG. 7) which releasably drivingly couples with a plug 50 fixed to the tubular inner core 52 of the take-up roll 22. Therefore, when the output shaft 46 of the motor rotates its rotational movement is transferred through the coupling member 48 and plug 50 to the core 52 to drive the roll 22 in unison with the shaft 46.

Figure 3:
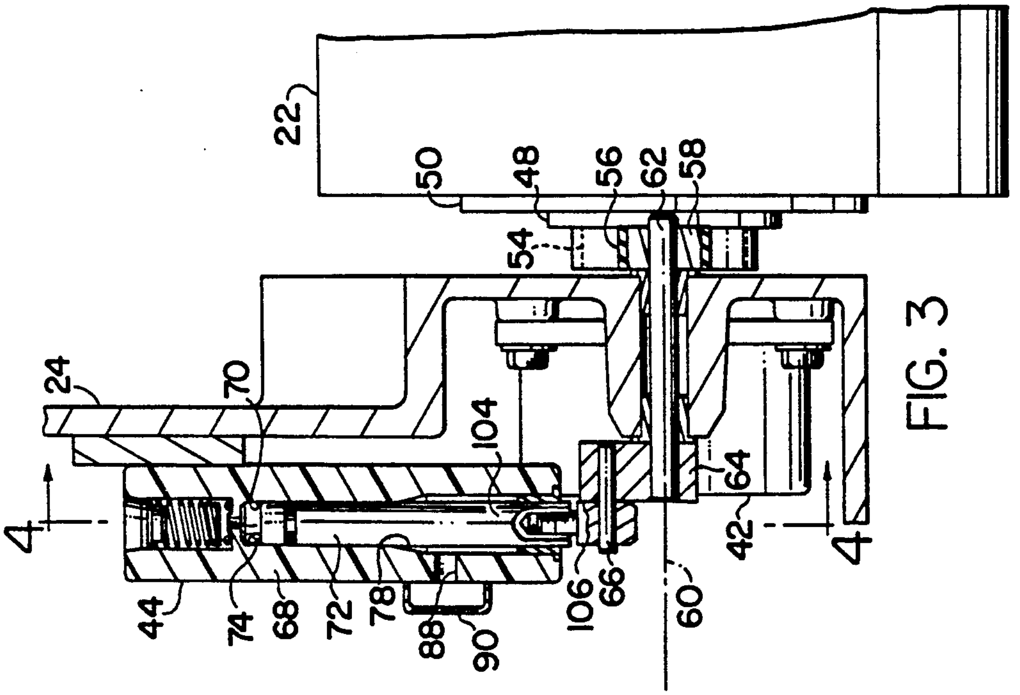
FIG. 3 is a sectional view through the pump taken generally on the line 3—3 of FIG. 2.

Fixed to the coupling member 48 is a toothed pulley 54 having trained about it a timing belt 56. This timing belt is also trained about another toothed pulley 58 rotatable about a second axis 60 fixed relative to the frame 24 and parallel to the axis 28. The pulley 58 is fixed to one end of a shaft 62 supported for rotation about the axis 60 as shown in FIG. 3. Fixed to the opposite end of the shaft 62 is an eccentric member 64 having an eccentric pin 66 spaced radially from the axis 60, which pin 66 serves to drive the piston of the pump 44 as hereinafter explained in more detail. It will be clearly appreciated then, that when the motor 42 is operated to drive the take-up roll 22 it also operates, through the belt 56 and pulleys 54 and 58, to drive the eccentric member 64 for driving the pump 44.

Figure 4:
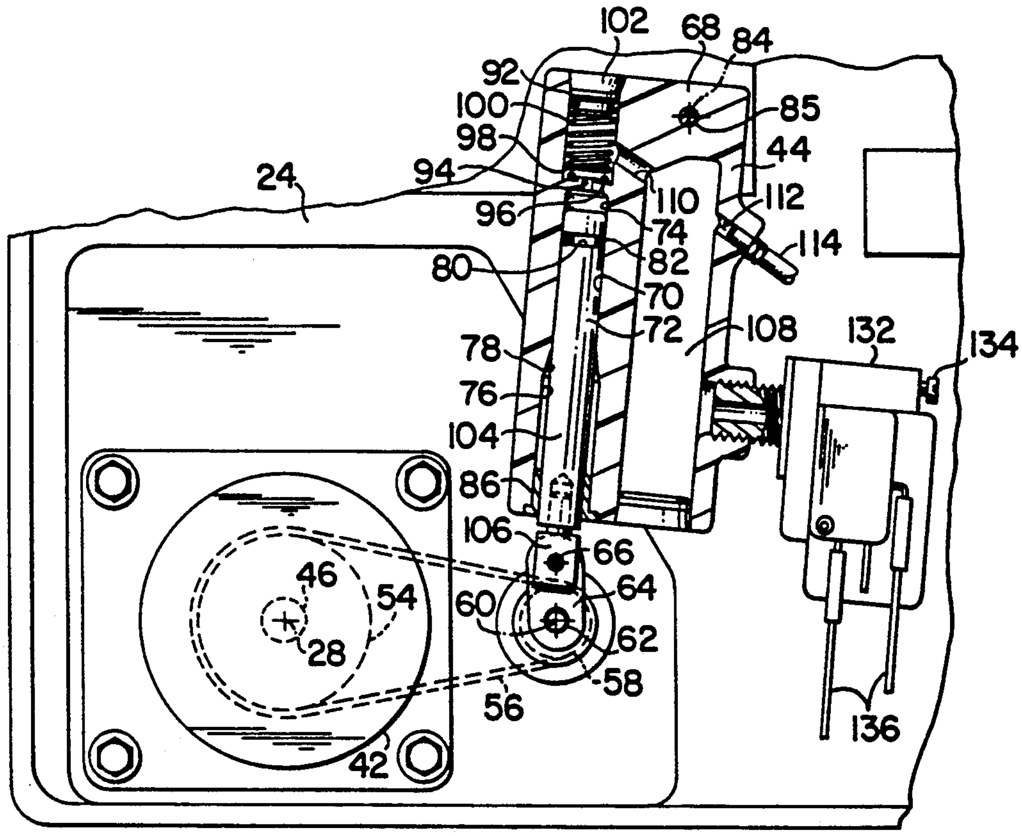
FIG. 4 is a view generally similar to FIG. 2 but with the pump being shown in a section taken on the line 4—4 of FIG. 3, this view showing the piston of the pump in the position occupied when the eccentric drive member is at its top dead center position.
Figure 5:
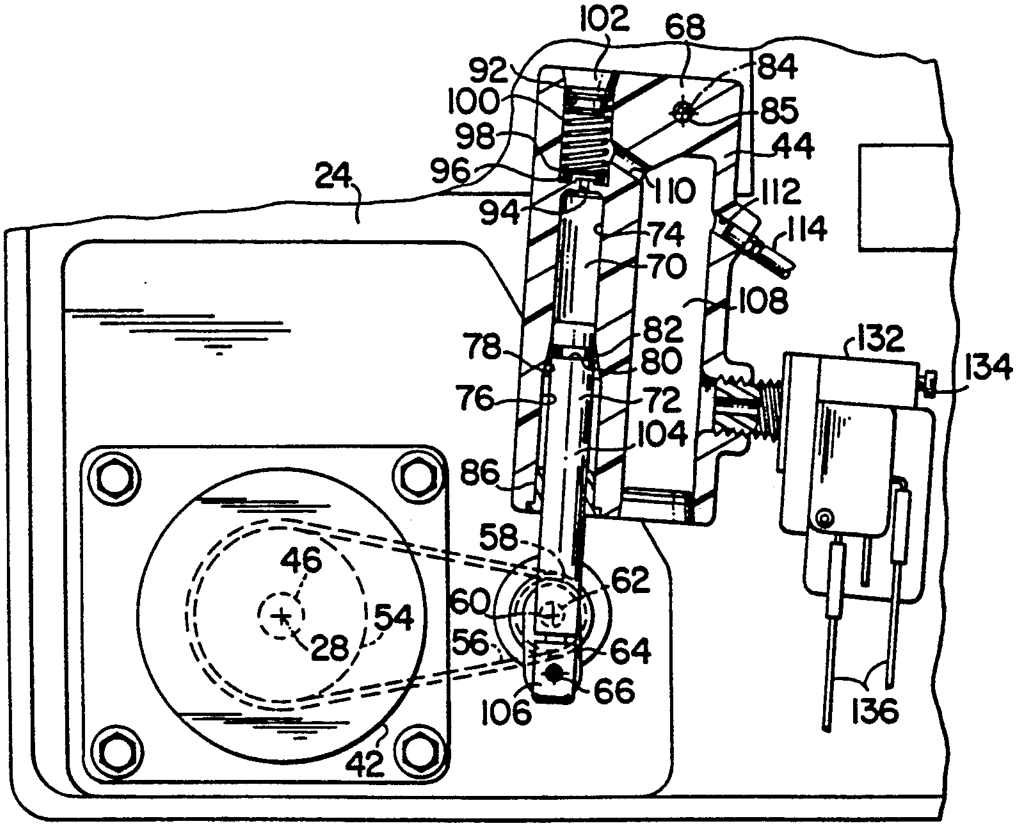
FIG. 5 is similar to FIG. 4 but shows the piston of the pump in the position occupied when the eccentric drive member is at its bottom dead center position.
Figure 6:
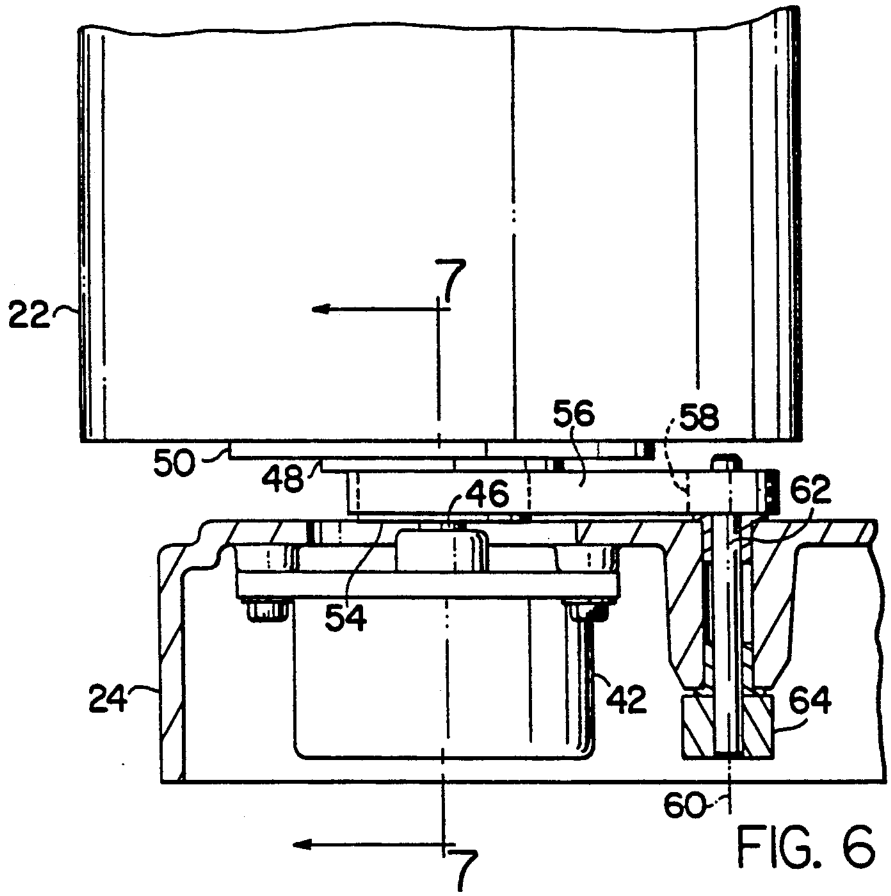
FIG. 6 is a view taken generally on the line 6—6 of FIG. 2.
Figure 7:
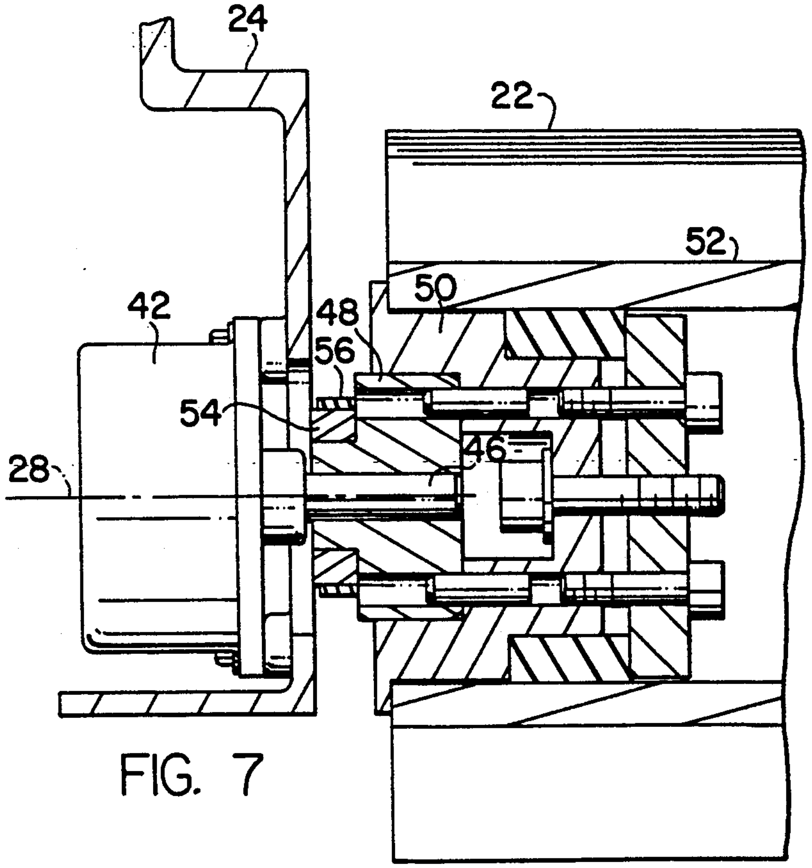
FIG. 7 is a view taken generally on the line 7—7 of FIG. 6.

Considering next the construction of the pump 44, as shown best in FIGS. 3, 4 and 5, the pump comprises a main body 68 having in general a block like outer appearance. It may be made from aluminum or other metal by machining or die casting, but preferably it is made of a plastic such as nylon or acital formed by machining or injection molding. Included in the body 68 is a cylindrical chamber 70 receiving a piston 72. The chamber 70 has an inner portion 74 of uniform diameter along its length and an outer portion 76 of another uniform diameter along its length, the diameter of the outer portion 76 being greater than that of the inner portion 72. Between the inner portion 74 and outer portion 76 is an intermediate portion 78 having a generally conical shape and providing a gradual transition between the large diameter of the outer portion 76 and the small diameter of the inner portion 74. At its inner end the piston includes an annular groove 80 receiving an O-ring 82 serving as a piston ring engagable with the wall of the inner chamber portion 74.

The outer end of the piston 72 is rotatably received on the eccentric pin 66 of the eccentric member 64. The pump body 68 is further adapted to be and is connected to the frame 24 of the plotter for rotation about a third axis 84 parallel to the axes 28 and 60, the illustrated means for so attaching the body to the frame being a fastener 85 which loosely passes through a hole in the body 68, the fastener having a head, followed by a smooth surface section which engages the body, followed in turn by a threaded portion threaded into the frame 24. Thus when the eccentric member 64 rotates the piston 72 is reciprocated in the cylindrical chamber 70 and the body 68 oscillates about the axis 84 of the fastener 85 to permit such reciprocation of the piston to occur without requiring an additional link between the eccentric pin 66 and piston 72.

At the outer end of the outer portion 76 of the cylindrical chamber 70 is a bushing 86 which slideably supports the piston 72.

The stroke of the piston 72 is such that during a minor portion of the stroke, as the piston passes through its bottom dead center position of FIG. 5, the O-ring 82 enters the conical intermediate chamber portion 78 and thereby allows air at atmospheric pressure to enter the inner chamber portion 70, the conical intermediate chamber portion 78 and the outer chamber portion 76 being in communication with the atmosphere surrounding the pump by an intake port 88, shown in FIG. 3, passing through the body from the outer surface thereof to one or the other of the chamber portions 78 and 76. In FIG. 3 the port 88 is shown to communicate with the outer chamber portion 76 but it could as well be located to communicate with the conical portion 78. A dirt filtering screen 90 covers the port 88.

As the piston moves inwardly from its bottom dead center position of FIG. 5 it compresses the air received in the inner portion 74 of the chamber. This compressed air in turn passes (if at sufficient pressure) from the chamber portion 74 to a bore 92, coaxial with the chamber portion 74, through a small communicating opening 94 passing between the bottom of the chamber portion 74 and the bottom of the bore 92.

Between the inner chamber portion 74 and the bore 92 is a check valve allowing pressurized air to flow from the chamber portion 72 to the bore 92 only when the pressure in the chamber portion 74 is of a sufficiently high value and to prevent the pressurized air in the bore 92 from flowing back into the chamber 74. This check valve may take various different forms, but preferably and as shown in FIGS. 4 and 5 it consists of an O-ring 96 received in the bottom of the bore 92 and surrounding the opening 94, which O-ring cooperates with a disc-shaped valve member 98 located outboard of the O-ring 96. The valve member 98 is urged toward seated engagement with the O-ring 96 by a helical compression spring 100 received in the bore and having an inner end engagable with the valve member 98 and an outer end engagable with a plug 102 sealing the outer end of the bore 92.

When the piston 72 undergoes a compression stroke the air in the inner chamber portion 74 is compressed and no air will flow from that chamber portion to the bore 92 until the pressure in the chamber portion 74 exceeds the pressure in the bore 92. The bore 92, as explained hereinafter, is part of an air space communicating with the ink reservoir. Therefore, the maximum pressure produced in the bore 92 and on the ink in the ink reservoir is limited to the maximum pressure achievable in the chamber portion 74 by operation of the piston. This maximum pressure is in turn dependent on the compression ratio of the piston 72 and chamber portion 74.

A feature of the invention is that the compression ratio of the piston 72, as it works with the chamber portion 74, is adjustable to allow for adjustment of the pressure of the pressurized air supplied to the ink reservoir. This adjustment is achieved by making the piston 72 of an inner part 104 and an outer part 106 threadably connected with one another. Therefore by rotating the inner part in one direction or the other relative to the outer part 106 the inner part 104 may be moved toward or away from the outer part 106 to vary the effective length of the piston. If the piston is lengthened in this way the compression ratio and the air pressure applied to the ink reservoir are increased. Similarly, if the piston is shortened the compression ratio and the pressure applied to the ink reservoir are decreased.

As shown in FIGS. 4 and 5, the main body of the pump includes an air reservoir 108 connected to the bore 92 by a passageway 110, and the reservoir 108 is in turn connected to an outlet port 112. The outlet port 112 is in turn connected through a suitable air line 114 to the ink reservoir 116 shown in FIG. 8 and forming part of the pen mechanism 32. Throughout part of its length the air line 114 forms a part of the flexible wand 38 extending between the fitting 40 and the pen mechanism 32. The bore 92, passageway 110, air reservoir 108, air line 114 and the space 128 above the ink in the ink reservoir 116 collectively define the air space containing the pressurized air applied to the ink in the ink reservoir. The air reservoir 108 provides extra capacity for the pressurized air and aids in keeping the pressure of the air supplied to the reservoir 116 at an acceptably steady value.

Figure 8:
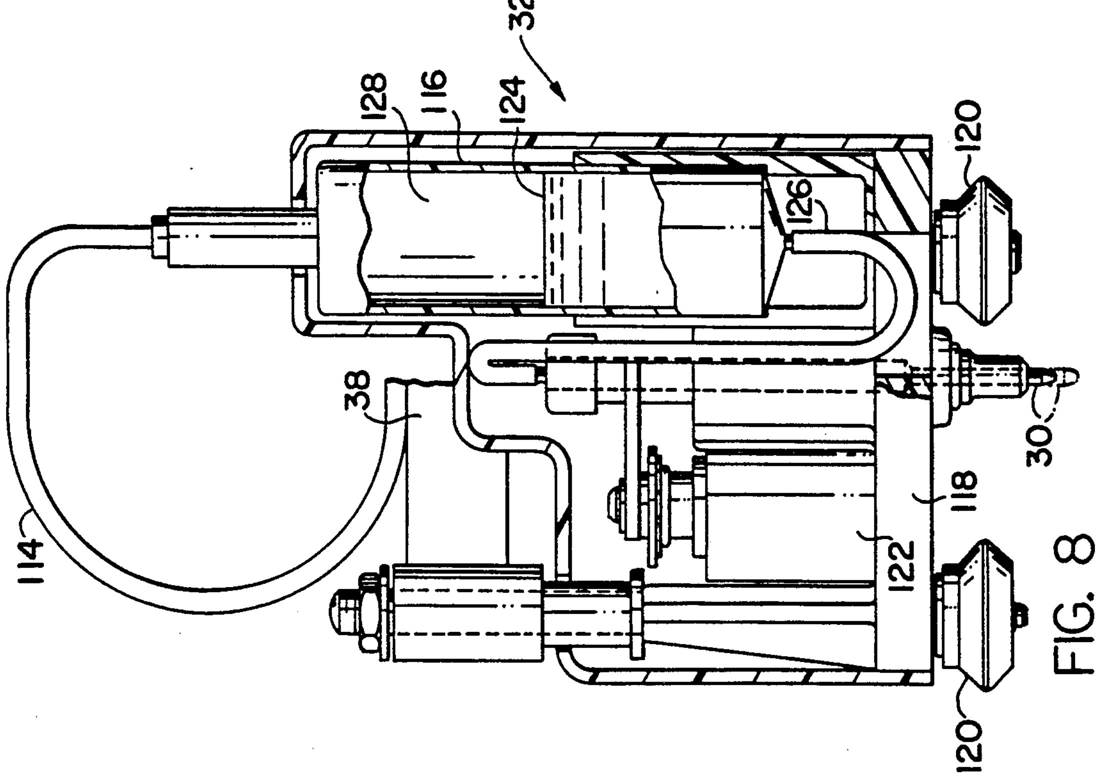
FIG. 8 is a vertical sectional view taken through the pen carriage of the plotter of FIG. 1.

The pen mechanism 32, as shown in FIG. 8, in addition to the pen 30 and the ink reservoir 116 includes a frame 118 supported by a set of wheels 120 for movement along the carriage 34. A solenoid 122 is carried by the frame 118 and is operable to move the pen 30 between an upper or non-writing position shown by the solid lines and a lower or writing position shown by the broken lines. The ink reservoir 116 contains a quantity of ink 124 supplied from the bottom of the reservoir to the pen through a line 126. When the level of ink 124 becomes low the reservoir can be refilled by supplying ink to it through a normally closed filling opening (not shown). In normal operation of the plotter the space 128 above the upper surface of the ink 124 is filled with pressurized air supplied by the line 114.

Figure 2:
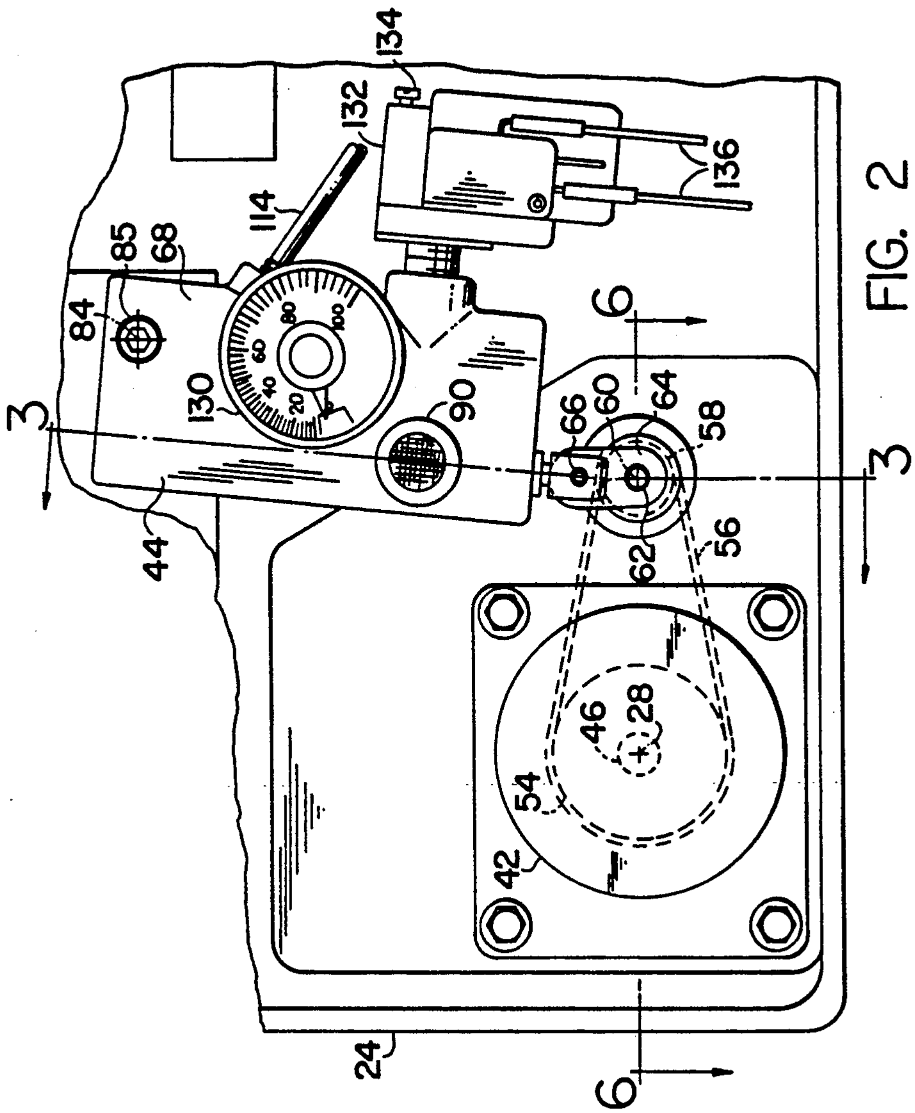
FIG. 2 is a fragmentary elevational view showing the pump of FIG. 1.

The best value of air pressure to use in the reservoir 116 is dependent on the nature of the pen 30 and on the viscosity and other characteristics of the ink 124, and as mentioned this pressure may be set to any desired value by varying the effective length of the piston 72. In a typical case, for example, the pump may be set to deliver air at a pressure of about 20–25 psig to the reservoir. To assit in properly setting the pump to whatever pressure output may be desired and to allow a monitoring of the pressure, the pump preferably, as shown in FIG. 2, is equipped with a pressure gauge 130 which communicates with and senses the pressure of the air in the air reservoir 108. Since the air reservoir forms part of the total air space containing the pressurized air applied to the ink the ink reservoir 116, the pressure sensed by the gauge is also the pressure of the air applied to the ink.

During drawing operations ink flows from the reservoir 116 at a very low volumetric rate, so the pump need supply only very small quantities of pressurized air to the ink reservoir. Therefore, the pump can keep up with this demand and keep the ink reservoir pressurized at the desired level even though the pump is relatively small and is driven only infrequently in unison with the paper advancements. On the other hand, the flow rate of air through the pen 30 when the ink reservoir and pen are empty of ink is such that the pump, as driven in unison with the paper advancements, because of leakage of air through the pen, is unable to maintain a significant pressure head in the reservoir.

In accordance with another aspect of the present invention, the latter feature of the system is taken advantage of to provide a simple means for indicating an out of ink condition. As shown in FIGS. 2, 4 and 5 the pump is provided with a pressure switch 132 communicating with the air reservoir 108 of the pump and therefore responsive to the pressure of the air in the air reservoir 108, the air line 114 and the ink reservoir 116. Preferably the switch 132 has a variable set pressure which can, for example, be varied by turning the illustrated screw 134. In any event, the set pressure of the switch 132 is set at a predetermined pressure, for example about 4 psig, substantially below the pressure normally maintained in the ink reservoir 116 and above the pressure capable of being maintained in the reservoir 116 by the pump when the ink reservoir and pen are out of ink. Therefore, when the ink reservoir and pen become out of ink the pressure in both the ink reservoir 116 and in the air reservoir 108 drops below the set pressure of the switch 132 and causes the switch to produce a signal on its output lines 136 indicating the loss of pressure. Normally the appearance of this signal will be in response to an out of ink condition but it could also be caused by a loss of pressure in other ways as by a rupture of the air line 114 or failure of the pump. In any event, the signal appearing on the lines 136 is fed to the control unit 138 of the plotter, illustrated in FIG. 1, and may be used by the control unit to generate a visual "out of ink" warning displayed, for example, by a visual display unit 140 on the plotter, or it may be used by the control unit to inhibit further drawing by the plotter as by causing the pen to be lifted from the paper by the solenoid 122 or by stopping further operation of the plotter completely.

Figure 9:
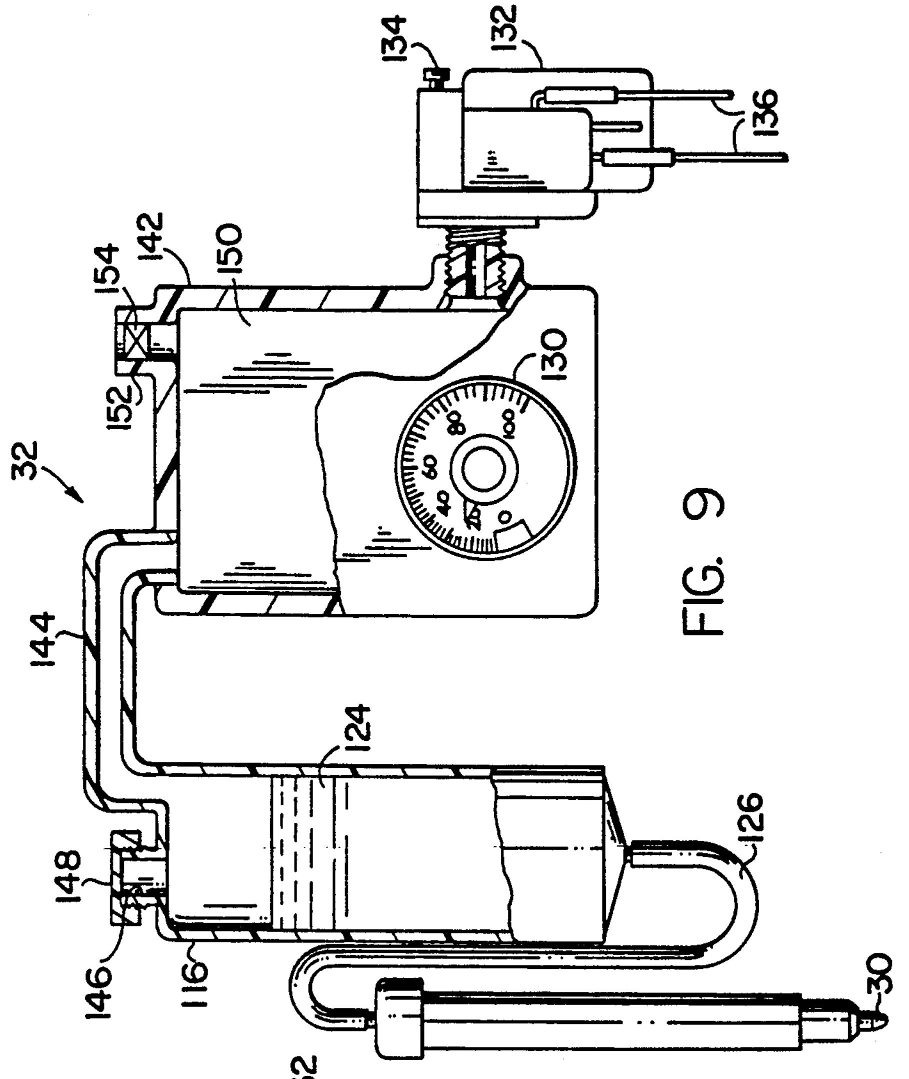
FIG. 9 is a schematic view showing the pen, ink reservoir, ink pressurizing means, and associated components of a plotter comprising another embodiment of the invention.

Another embodiment of the invention is shown in FIG. 9 and involves a different form of pressurizing means for supplying pressurized air to the ink 124 in the reservoir 116. Except for this difference the other parts of the plotter are the same as those shown in FIG. 1 to 8.

As shown in FIG. 9, the means for supplying pressurized air to the ink 124 in the ink reservoir 116 consists of an associated means providing a closed air space communicating with the reservoir 116 and having a sufficiently large volume, in comparison to the volume of the ink contained in the reservoir 116 when the reservoir is filled with a maximum amount of ink, that after the ink reservoir is filled with ink, the air space may be given a charge of pressurized air which will continue to adequately pressurize the ink in the reservoir until the reservoir becomes nearly empty of ink. Such an air space providing means may take various different forms and may be located at various places on the plotter. Preferably, it is located on the frame 118 of the pen mechanism 32 in close association with the ink reservoir 116 and pen 30 so as to form part of the ink mechanism 32, but it may also, if desired, be located on some other part of the plotter and be connected with the ink reservoir 116 through an air line along part of its length forming part of the wand 38.

In FIG. 9, the air space providing means is illustrated as a hollow thin-walled body 142 carried by the frame 118 (not shown in FIG. 9) of the pen mechanism 32 and connected with the ink reservoir by a connecting line 144. The ink filling port for the ink reservoir is shown at 146 and is normally closed by a cap 148 threadably connected with the port 146.

The interior of the body 142 communicates with the upper end of the ink reservoir 116 through the connecting line 144, so that the interior of the body 142 in combination with the space above the ink in the reservoir 116 and the interior of the connecting line 144 form an air space 150 in overlying relation to the ink. Also associated with the body 142 is a pressure gauge 130 for sensing and indicating the pressure of the air in the air space 150, and a pressure sensitive switch 132 which provides a signal on the lines 136 when the pressure in the air space 150 drops below a predetermined value. This predetermined or set pressure value may in turn be adjusted by operation of the adjusting screw 134.

A charge of pressurized air may be introduced to the air space 150 through an air inlet port 152 on the body 142 having a check valve 154. The check valve permits flow of air into the body 142 through the port 152 and prevents its flow in the reverse direction. When a charge of pressurized air is to be supplied to the air space 150 it may be applied through the inlet port 152 in various different ways, such as through the use of a hand operated pump similar to a bicycle pump or through the use of a canister of pressurized air.

The operation of the mechanism shown in FIG. 9 is as follows. When it becomes desirable to refill the reservoir 116 with ink, the plotter is stopped and the cap 148 removed from the ink filling port 146. This releases the pressure, if any, of the air space 150. Ink is then filled into the reservoir 116 until reaching the desired filled level. The caps 148 is then replaced on the filling port 146 and sufficiently tightened to provide an airtight seal. A charge of pressurized air is then supplied to the air space 150 through the air inlet port 152 until the pressure in the air space 150 reaches a given desired value. The pressure gauge 130 senses the pressure in the air space 150. Therefore during the charging of air into the space 150, the gauge 130 may be observed and the filling process terminated when it indicates the desired pressure having been reached. Again, the pressure to which the air space 150 is initially charged depends on a number of factors, particularly the type of pen used and the type of ink used, and may vary widely. In an exemplary case, however, the pressure to which the space 150 is initially charged may be taken to be about 20 to 25 psig.

After the charge of pressurized air is supplied to the air space, the plotter may be operated to draw lines with the pen 30. As such drawing progresses, ink is consumed from the reservoir 116 by the pen 30. This in turn means that the volume of the air space 150 overlying the ink gradually increases. Generally, no additional air is added to the air space between refillings of the ink reservoir 116, so the pressure of the air in that space gradually lowers due to its increase in volume as the ink reservoir empties. As mentioned, however, the size of the air space 150 when the reservoir is in a filled condition is such that the pressure in the space 150 still has a significant positive value when the reservoir reaches the condition of being nearly empty of ink. Given an initial starting pressure in the air space 150 when the ink reservoir 116 is full of ink, the pressure when the ink reservoir is nearly empty of ink is dependent on the relative volumes of the air space 150 at the two times in question, and these relative volumes may accordingly be designed, principally by controlling the sizes of the ink reservoir 116 and body 142, to provide whatever pressure may be desired when the ink reservoir is nearly empty of ink. By way of example, in the present instance it is taken that given a starting air pressure of 25 psig when the reservoir 116 is filled with ink, the beginning and final volumes of the air space 150 are such that when the reservoir 116 becomes nearly empty of ink, the air pressure in the air space is at least 4 psig.

A preferred operation of the plotter is to always refill the ink reservoir 116 before it reaches a completely empty condition. Should such refill not, however, be made in time, the pressure switch 132 provides an indication which, as mentioned in connection with the embodiment of FIGS. 1 to 8, provides a warning signal and/or inhibits further drawing operation of the plotter.

The procedure as the reservoir 116 runs out of ink is as follows. As the reservoir reaches a near empty condition, the pressure of the overlying air space is still of a significant positive value, that is for example above 4 psig, sufficient to promote adequate flow of ink to and through the pen 30. The pressure switch 32 is set to operate when the pressure of the air space 150 reaches a significantly smaller value, for example 1 psig. After the last of the ink from the reservoir 116 passes through the pen 30, the pen allows air to flow or leak through it. This air flow or leakage through the pen 30 quickly reduces the air pressure in the space 150 to that of the surrounding atmosphere and causes the pressure switch 132 to provide an output signal on the lines 136 as it detects the pressure of the air space 150 falling to and below it value to which the is preset.

What is claimed is:

1. A pump for use in supplying pressurized air to the pen mechanism of a plotter and adapted to be driven by an eccentric member rotatable about a first axis fixed relative to the frame of the plotter and having an eccentric point spaced from said axis, said pump comprising:

a main body having a cylindrical chamber, a piston slideably received in said chamber, said piston including an inner portion slideable in said cylindrical chamber and an outer portion which extends outwardly of said body, said outer portion being adapted for connection to said eccentric point of said eccentric member so that said piston is reciprocated in said chamber as said eccentric member is rotated about said first axis, a piston ring carried by said inner piston portion, means for connecting said piston to said eccentric point of said eccentric member so that in response to rotation of said eccentric member about said first axis said piston is reciprocated in said chamber between a top dead center position and a bottom dead center position, said main body including air inlet port means providing communication between the atmosphere and an air intake point located along the length of said chamber, said air intake point being so located that when said piston is in said bottom dead center position said piston ring is located between said air intake point and said eccentric member so that air may flow from the atmosphere into the inner part of said chamber located on the side of said piston opposite said eccentric member and so that during movement of said piston from its bottom dead center position to its top dead center position said piston ring moves past said air inlet point and thereby cuts off communication between the atmosphere and said inner port of said chamber so that the air in said inner part of said chamber is thereafter compressed by the following movement of said piston toward said top dead center position, and means for adjustably moving said inner piston portion toward and away from said outer piston portion to vary the compression ratio of said pump.

2. A pump as defined in claim 1 further characterized by said main body of said pump including an outlet port, said chamber having an inner end, and means providing an air passage from said inner end of said chamber to said outlet port, a check valve in said air passage providing means between said inner end of said chamber and said outlet port, said check valve including a bore formed in said main body of said pump co-axial with said chamber, said bore having a bottom end spaced axially from said inner end of said chamber, a central passage providing communication between said inner end of said chamber and said bottom end of said bore, an O-ring in said bore flatly engageable with said bottom end of said bore and surrounding said passage to provide a valve seat, a valve member in said bore adjacent to and outboard of said O-ring and flatly engageable with said O-ring on the side thereof opposite said bottom end of said bore, a helical compression spring located in said bore outboard of said valve member, said spring having an inner end engaging said valve member and an outer end located outboard of said inner end, and a closure member at the outer end of said bore closing the outer end of said bore and engaging said outer end of said spring, said spring being of such length as to urge said valve member into sealing engagement with said O-ring, and said air passage providing means including means providing an air passage between a point of said bore located outboard of said O-ring and said output port.

3. A pump as defined in claim 2 further characterized by said air passage in said main body including a reservoir for pressurized air, which reservoir is located between said bore and said output port.

4. A pump as defined in claim 1 further characterized by said cylindrical chamber having an inner portion of uniform first diameter along its length, an outer portion of a uniform second diameter along its length, which second diameter is greater than said first diameter, and an intermediate portion of generally conical shape providing a transition between said first and second diameters, said inner portion of said piston having an annular groove near its inner end, and an O-ring received in said groove and serving as a piston ring for engagement with the wall of said inner portion of said cylindrical chamber, and means providing communication between said intermediate portion of said chamber and the atmosphere surrounding said body, said piston when connected to said eccentric member having a stroke during the major portion of which said piston ring is located in said inner portion of said chamber and during a minor portion of which said piston ring is located in said intermediate portion of said chamber so as to allow air at atmospheric pressure to enter said inner portion of said chamber.

5. A pump as defined in claim 1 further characterized by said piston ring being an O-ring.

6. A pump as defined in claim 1 further characterized by said inner portion of said chamber having a uniform diameter along its length, said air inlet means including a chamber portion of larger diameter than the diameter of said inner chamber portion at said air intake point, which chamber portion of larger diameter receives said piston ring when said piston is in its bottom dead center position.

7. A pump as defined in claim 6 further characterized by said chamber portion of larger diameter being of conical shape.

8. A pump for use in supplying pressurized air to the pen mechanism of a plotter and adapted to be driven by an eccentric member rotatable about a first axis fixed relative to the frame of the plotter and having an eccentric point spaced from said axis, said pump comprising:

a main body having a cylindrical chamber with an inner end, a piston slideably received in said chamber, said main body of said pump including an outlet port, means providing an air passage from said inner end of said chamber to said outlet port, a check valve in said air passage providing means between said inner end of said chamber and said outlet port, said cylindrical chamber having an inner portion of uniform first diameter along its length, an outer portion of uniform second diameter along its length, which second diameter is greater than said first diameter, and an intermediate portion of generally conical shape providing a transition between said first and second diameters, said piston having an annular groove near its inner end, an O-ring received in said annular groove and serving as a piston ring for engagement with the wall of said inner portion of said cylindrical chamber, and means providing air communication between said intermediate portion of said chamber and the atmosphere surrounding said body, said piston when connected to said eccentric member having a stroke during the major portion of which said piston ring is located in said inner portion of said chamber and during a minor portion of which said piston ring is located in said intermediate portion of said chamber so as to allow air at atmospheric pressure to enter said inner portion of said chamber.

9. A pump as defined in claim 8 further characterized by a bushing in said outer portion of said chamber slideably engaging said piston, and said means providing air communication between said intermediate portion of said chamber and the atmosphere being an intake port passing through said body from its outside surface to either said intermediate portion of said chamber or to said outer portion of said chamber.

10. A plotter comprising:

means providing a support surface for supporting a portion of a web of sheet material, a pen mechanism moveable relative to said support surface, said pen mechanism having a pen for drawing on the portion of a web of sheet material supported by said support surface and also having an ink reservoir for containing ink used by said pen, a web advancing means for moving a web of sheet material over said support surface to bring fresh portions of said web to said support surface for drawing thereon by said pen, a pump for supplying pressurized air to said pen mechanism to pressurize the ink in said ink reservoir used by said pen, drive means for driving said web advancing means and said pump in unison so that said pump is operated only when said web is moved over said support surface by said web advancing means, said pump when operated supplying pressurized air at such a rate that, as a result of its being driven in unison with said web advancing means, so long as ink remains in said pen said pump keeps the air in said ink reservoir pressurized above a predetermined value of pressure, and said pen when empty of ink allowing air to flow therethrough at such a rate that said pump, as a result of its being driven in unison with said web advancing means, does not keep said ink reservoir pressurized at a pressure above said predetermined value, and a pressure sensitive switch responsive to the pressure of the air in said ink reservoir for providing a signal when said pressure falls below said predetermined value.

* * * * *